(12) United States Patent
Yang et al.

(10) Patent No.: US 8,769,104 B2
(45) Date of Patent: Jul. 1, 2014

(54) SYSTEM AND METHOD FOR LOADING WEB PAGE USING MULTIPLE PATHS IN MULTIPLE INTERFACE CIRCUMSTANCES

(75) Inventors: Jin Hong Yang, Daejeon (KR); Jun Kyun Choi, Daejeon (KR); Sang Min Park, Daejeon (KR)

(73) Assignee: Intellectual Discovery Co., Ltd., Seoul (KR)

( * ) Notice: Subject to any disclaimer, the term of this patent is extended or adjusted under 35 U.S.C. 154(b) by 269 days.

(21) Appl. No.: 13/217,862

(22) Filed: Aug. 25, 2011

(65) Prior Publication Data

US 2012/0226809 A1    Sep. 6, 2012

(30) Foreign Application Priority Data

Mar. 2, 2011    (KR) .................. 10-2011-0018654

(51) Int. Cl.
*G06F 15/173* (2006.01)
*H04L 29/08* (2006.01)
*H04L 29/06* (2006.01)

(52) U.S. Cl.
CPC ............... *H04L 67/02* (2013.01); *H04L 69/14* (2013.01)
USPC ........................................................ 709/226

(58) Field of Classification Search
USPC ........................................................ 709/226
See application file for complete search history.

(56) References Cited

FOREIGN PATENT DOCUMENTS

| KR | 10-2011-0001371 | * | 1/2011 | ............. H04W 4/18 |
| KR | 2011-0001371 A | | 1/2011 | |

OTHER PUBLICATIONS

Office Action for Korean Patent Application 10-2011-0018654, dated Sep. 7, 2012.

* cited by examiner

*Primary Examiner* — Hee Soo Kim
(74) *Attorney, Agent, or Firm* — Fox Rothschild LLP

(57) ABSTRACT

A system and method for loading a web page using multiple paths in multiple interface circumstances are disclosed. The web page loading system providing multiple interfaces may include an allocator to set interfaces for loading resources, for each resource, constituting a web page associated with a Hypertext Transfer Protocol (HTTP) request when the HTTP request is received from a browser. In this instance, the browser may render the web page by respectively loading corresponding resource data through the interfaces set for each resource.

8 Claims, 9 Drawing Sheets

SYSTEM AND METHOD FOR LOADING WEB PAGE USING MULTIPLE PATHS IN MULTIPLE INTERFACE CIRCUMSTANCES

CROSS-REFERENCE TO RELATED APPLICATION

This application claims the benefit of Korean Patent Application No. 10-2011-0018654, filed on Mar. 2, 2011, in the Korean Intellectual Property Office, the disclosure of which is incorporated herein by reference.

BACKGROUND

1. Field of the Invention

Embodiments of the present invention relate to a system and method for loading a web page using multiple paths in circumstances of multiple interfaces.

2. Description of the Related Art

Generally, mobile devices include at least two interfaces to allow for connection to the Internet. Although the mobile devices include multiple interfaces, a single interface is selectively used when performing a communication. Since the mobile devices load a web page through a particular path depending on a selected interface, there may be a limitation in reducing a loading time of the web page.

Currently, other methods which use multiple paths are being applied to communication where a sequence of packets is important, such as, Transmission Control Protocol (TCP). However, when using the multiple paths, a configuration of the methods may be complex and thus, a great amount of overhead may respectively occur.

Accordingly, there is a need for research on a method capable of loading a web page more rapidly using multiple paths in circumstances of multiple interfaces.

SUMMARY

An aspect of the present invention provides a system and method for loading a web page that may load a web page more rapidly using multiple paths in circumstances of multiple interfaces.

Another aspect of the present invention also provides a system and method for loading a web page that may load resources, for each resource constituting the web page, thereby improving a loading bandwidth and reducing a loading time.

According to an aspect of the present invention, there is provided a system for loading a web page, which may include multiple interfaces, the system including: an allocator to set interfaces for loading resources, for each resource, constituting a web page associated with a Hypertext Transfer Protocol (HTTP) request when the HTTP request is received from a browser, wherein the browser may render the web page by respectively loading corresponding resource data through the interfaces set for each resource.

The allocator may include a size reception unit to receive individual sizes for each resource from a server providing the web page, and a resource allocator to request loading of the resources to the interfaces based on bandwidths for each interface depending on the individual sizes for each resource.

The system may further include a bandwidth monitor to monitor an amount of time expended until a response with respect to a data transmission request for each interface is received, along with a size of data received via the response, and to collect bandwidth data calculated based on the amount of the time expended, and the size of the data, and to then calculate the bandwidths for each interface based on the collected bandwidth data.

The resource allocator may allocate the resources in a sequential order, starting from a resource of the greatest individual size, to the interfaces in a corresponding sequential order, starting from an interface having the most rapid bandwidth.

The resource allocator may allocate, to the interfaces, the resources in a sequential order, starting from a resource of the greatest individual size, and may allocate the resources within a capacity defined based on the bandwidths for each interface and a shortest loading time (SLT). Here, the SLT may refer to a time defined based on an overall size calculated by summing individual sizes for each resource, and an overall bandwidth calculated by summing bandwidths for each interface.

According to another aspect of the present invention, there is provided a method of loading a web page, performed by a system for loading a web page, which may include multiple interfaces, the method including: setting interfaces for loading resources, for each resource, constituting a web page associated with an HTTP request when the HTTP request is received from a browser, wherein the browser may render the web page by respectively loading corresponding resource data through the interfaces set for each resource.

EFFECT

According to embodiments of the present invention, resources constituting the web page may be loaded for each resource, simultaneously using multiple paths, and thereby a loading bandwidth may be improved in accordance with a sum of bandwidths supported by each interface, and consequently the loading time of the web page may be greatly reduced.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
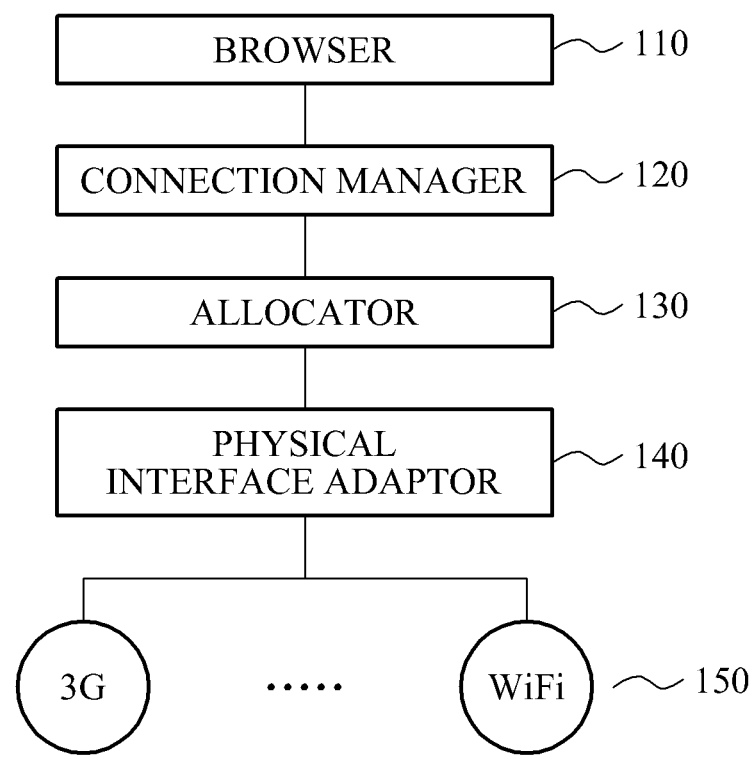
FIG. 1 is a diagram illustrating a system for loading a web page using multiple paths according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a system for loading a web page using multiple paths according to an embodiment of the present invention. In FIG. 1, a configuration of the web page loading system in circumstances where multiple interfaces may be supported is illustrated.

The web page loading system may be applied to a communication terminal including at least two distinct interfaces 150 to connect to the Internet. The web page loading system may support the multiple interfaces 150 to enable use of multiple types of networks, for example, 3G, Wifi, Zigbee, Bluetooth, Wireless Local Area Network (WLAN), and Femtocell, Wibro, and the like.

Referring to FIG. 1, a communication line access of a physical interface adaptor 140 may be controlled by a connection manager 120 in order to access a site requested by a browser 110. A web page, which may refer to a document that may be transmitted between a web server and the browser 110 according to a Hypertext Transfer Protocol (HTTP) in the Internet, generally includes multiple resources. That is, the web page may include the multiple resources, such as a Hyper Text Markup Language (HTML) file, an image file, a script file, and the like. Although the resources of the web page may be loaded for each of the resources (hereinafter referred to as 'individual resources'), a Document Object Model (DOM) may be generated in the browser 110 without any problems. Actually, when rendering a single web page, multiple HTTP requests may occur in the browser 110.

The web page loading system may load the web page by applying an HTTP scheme where individual resources constituting the web page may be separately requested irrespective of order. That is, the web page loading system may load the web page simultaneously using multiple paths in circumstances where the multiple interfaces 150 may be supported. Further, the web page loading system may additionally include a new component, an allocator 130 between the connection manager 120 and the physical interface adaptor 140. In this instance, the allocator 130 may be operated independently of the existing components, and may request individual resources, for each interface, in the web page associated with HTTP requests when the HTTP requests are received from the browser 110.

Figure 2:
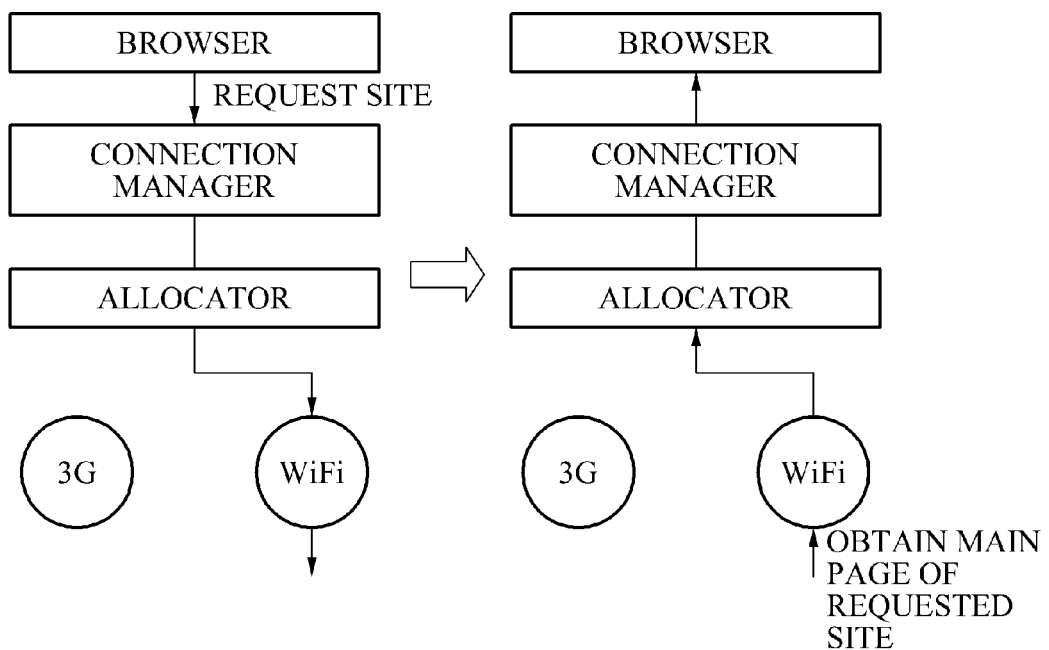
FIGS. 2 through 4 are diagrams illustrating a process of loading a web page according to an embodiment of the present invention.
Figure 3:
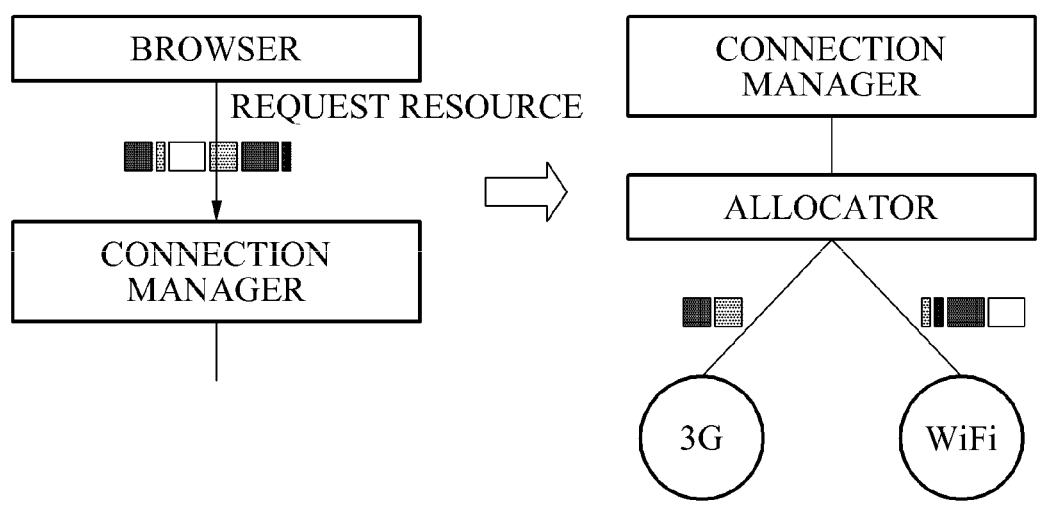
Figure 4:
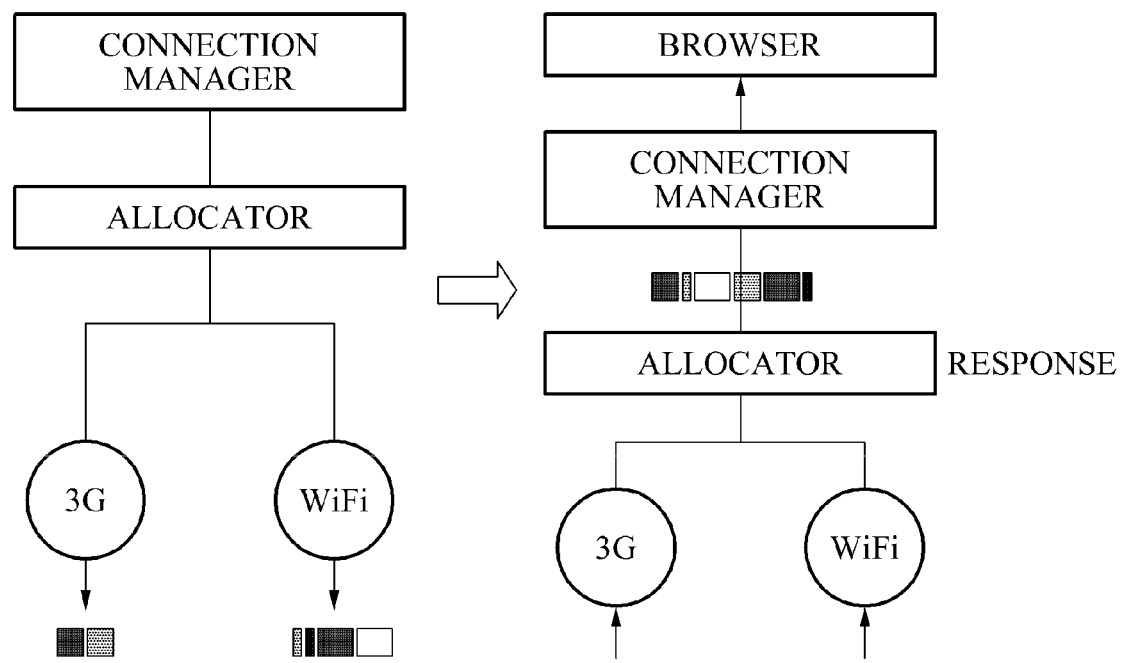

FIGS. 2 through 4 are diagrams illustrating a process of loading a web page according to an embodiment of the present invention.

Referring to FIG. 2, types of individual resources included in a web page of a site requested by a browser may be confirmed by requesting and obtaining a main page from a web server through a predetermined interface, using a connection manager. In particular, the web page loading system may need to recognize a number of resources and sizes of individual resources to be downloaded, after the web page is loaded on an active browsing object. Referring to FIG. 3, when the browser requests the individual resources using Uniform Resource Identifiers (URIs) of the individual resources, the allocator may respectively allocate the individual resources to the interfaces based on bandwidths of each of the interfaces. In this instance, referring to FIG. 4, when each of the interfaces requests allocated individual resources, and receives a response with respect to corresponding resource data from the server, the received resource data may be loaded to an upper level component. Accordingly, the browser may receive the resource data loaded using the multiple paths, and may render the web page corresponding to the HTTP requests.

The web page loading system may recognize an active browsing object on the browser, access a corresponding browser process, may request a number and a size of individual resources included on the web page, and may receive a response with respect to the request. After the number and the size of the individual resources are confirmed, the web page loading system may load the web page using multiple paths by requesting individual resources for each interface to have a shortest loading time (SLT) based on the bandwidths of each of the interfaces when the allocator receives requests.

A configuration and operations of the aforementioned allocator 130 will be further described hereinafter.

Figure 5:
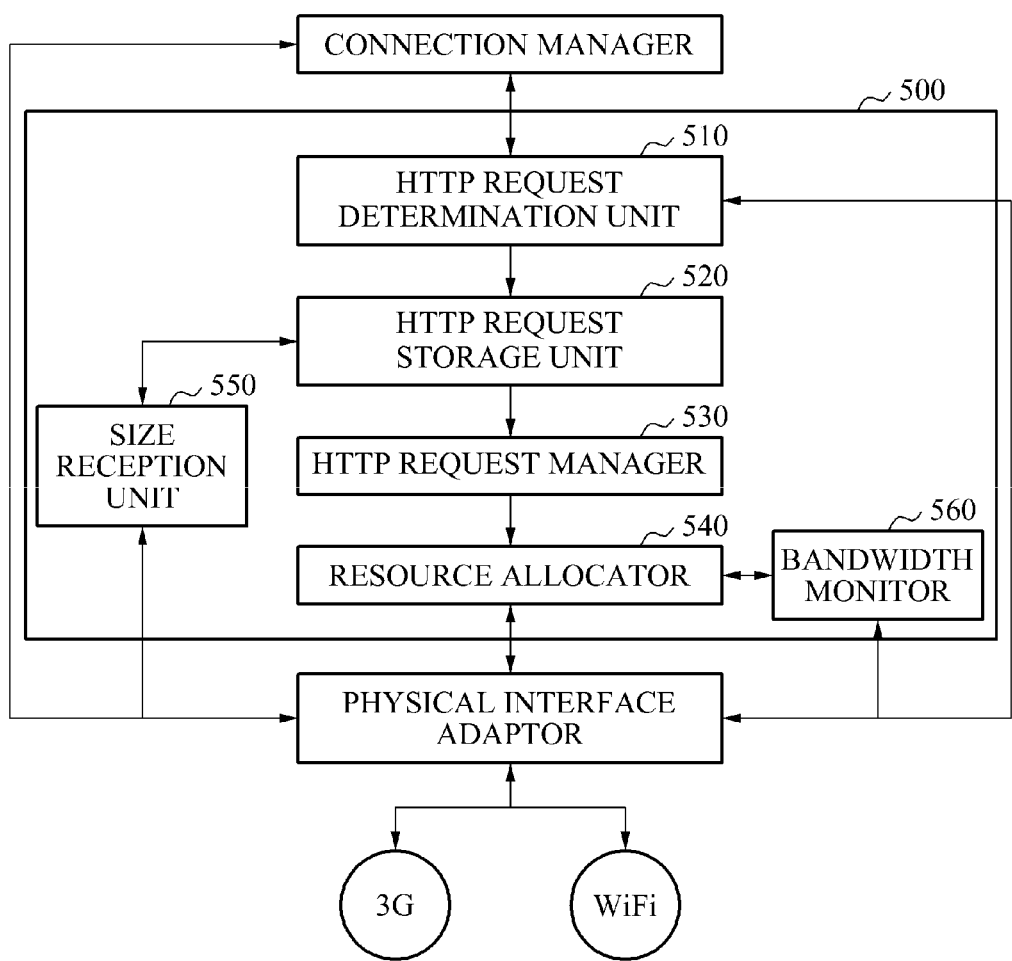
FIG. 5 is a diagram illustrating a configuration of an allocator that may set interfaces, for each resource constituting a web page according to an embodiment of the present invention.

FIG. 5 is a diagram illustrating a configuration of an allocator 500 that may set interfaces for each resource constituting a web page according to an embodiment of the present invention.

In the web page loading system, the allocator 500 may perform a task for optimal data loading with respect to HTTP requests by filtering data requests to be transferred to a physical interface adaptor. The following process may be applied to HTTP only, among requests and responses with respect to all transmission data. Also, when the connection manager requests an activated interface, other requests unrelated to HTTP may be transferred from the physical interface adaptor directly to the connection manager, instead of undergoing the following process. That is, the web page loading system may bypass the allocator 500 in case of the requests excluding the HTTP requests.

Referring to FIG. 5, the allocator 500 may include an HTTP request determination unit 510, an HTTP request storage unit 520, an HTTP request manager 530, a resource allocator 540, a size reception unit 550, and a bandwidth monitor 560.

When a data transmission request is received, the HTTP request determination unit 510 may determine whether the data transmission request may correspond to an HTTP request. When the data transmission request corresponds to the HTTP request, the HTTP request determination unit 510 may transfer the data transmission request to the HTTP request storage unit 520. When the data transmission request is different from the HTTP request, the HTTP request determination unit 510 may transfer the corresponding data transmission request directly to the physical interface adaptor.

The HTTP request storage unit 520 may store and maintain the HTTP request received from the HTTP determination unit 510. Also, the size reception unit 550 may request sizes of individual resources constituting a web page associated with the HTTP request to the physical interface adaptor, and may receive the sizes of the individual resources via a response from a server. In this instance, the size reception unit 550 may transfer, to the HTTP request storage unit 520, the sizes for each individual resource received from the server, and the HTTP request storage unit 520 may store and maintain the sizes for each individual resource received from the size reception unit 550.

The HTTP request manager 530 may stand by during a predetermine time, then poll the HTTP request stored in the HTTP storage unit 520, and transfer the polled HTTP request to the resource allocator 540. That is, the HTTP manager 530 may recognize the stored HTTP request as an equivalent connection, during a predetermined time, for example, for 100 milliseconds (ms).

When the HTTP request is received, the resource allocator 540 may perform load balancing to allocate the individual resources to each interface with respect to the HTTP request. In order to complete the load balancing, average bandwidths of each interface may need to be confirmed, and a total number of the individual resources, and sizes of the individual resources (hereinafter referred to as "individual sizes"), may also need to be confirmed. For example, the resource allocator 540 may set the interfaces for each individual resource depending on individual sizes based on average bandwidths of each interface. With regard to data transmission of the physical interface adaptor, several pieces of information may be monitored, and bandwidths supported by each interface may be calculated based on the monitored information. As a component to perform the aforementioned, the bandwidth monitor 560 may request transmitting of data, and may calculate and record an amount of time expended until a response with respect to the corresponding request is received when the data transmission occurs at the physical interface adaptor. That is, in more detail, the bandwidth monitor 560 may record a point in time when the physical interface adaptor requests the data transmission, that is, a point in time of staring the data transmission, which will be referred to as a first time, and a point in time when a response with respect to the request is received, which will be referred to as a second time. The bandwidth monitor 560 may also record a size of the data received via the response, using a factor. Then, the bandwidth monitor 560 may calculate an amount of time expended in receiving the response with respect to the data transmission request, based on the first time and the second time. The bandwidth monitor 560 may calculate a bandwidth with respect to the data transmission based on the amount of the time expended, and the size of the data recorded using the factor, and may record and maintain the calculated bandwidth. For example, the bandwidth monitor 560 may record the amount of the time expended and the size of the data associated with each data transmission. Every time a data transmission for each interface occurs, the bandwidth monitor 560 may collect bandwidth data, average a plurality of the collected bandwidth data, and record a corresponding average value, that is, an average bandwidth, by performing the foregoing process. Then, the resource allocator 540 may receive the individual sizes and URIs for each individual resource, by polling resources of the web page associated with the HTTP request, and may receive average bandwidths of each interface. The resource allocator 540 may arrange the individual resources based on the individual sizes, and may then allocate the individual resources in a sequential order, starting from a resource of the greatest individual size, to the interface in a corresponding sequential order, starting from an interface having the most rapid average bandwidth. In this instance, the resource allocator 540 may allocate the individual resources for each interface so that a total amount of loading time expended by the interfaces may be minimized. When the web page loading system includes n interfaces, an ideal loading time of the web page using multiple paths may correspond to an SLT defined as follows:

SLT=overall size of resources calculated by summing individual sizes/(average bandwidth of interface 1+ . . . +average bandwidth of interface n).

Accordingly, the resource allocator 540 may allocate the individual resources in a sequential order, starting from an individual resource of the greatest size, within the STL and within a capacity according to the average bandwidths for each interface and the SLT, that is, average bandwidths×SLT. Also, when the SLT is exceeded, the resource allocator 540 may allocate the individual resources to the interfaces, by increasing the SLT, and by mapping individual resources, in a sequential order, starting from an individual resource of the greatest size, among the remaining individual resources, within a capacity obtained by increased SLT×average bandwidths. In this instance, it is importance to rapidly reflect a bandwidth fluctuation for each interface. Thus, when an HTTP request exists with respect to the same path, the resource allocator 540 may apply a weight to a corresponding value, and may return a resulted value, thereby performing a load balancing process by reflecting the returned value when the HTTP request is received in the future.

According to the aforementioned configuration, the web page loading system may respectively request individual resources of a web page corresponding to an HTTP request of a browser to interfaces, irrespective of order. In particular, the web page loading system may load the web page more rapidly using multiple paths, by allocating, to interfaces, resources in a sequential order, starting from a resource of a greater size, based on sizes of the individual resources and bandwidths of each interface so that an amount of loading time to be expended may be minimized.

Figure 6:
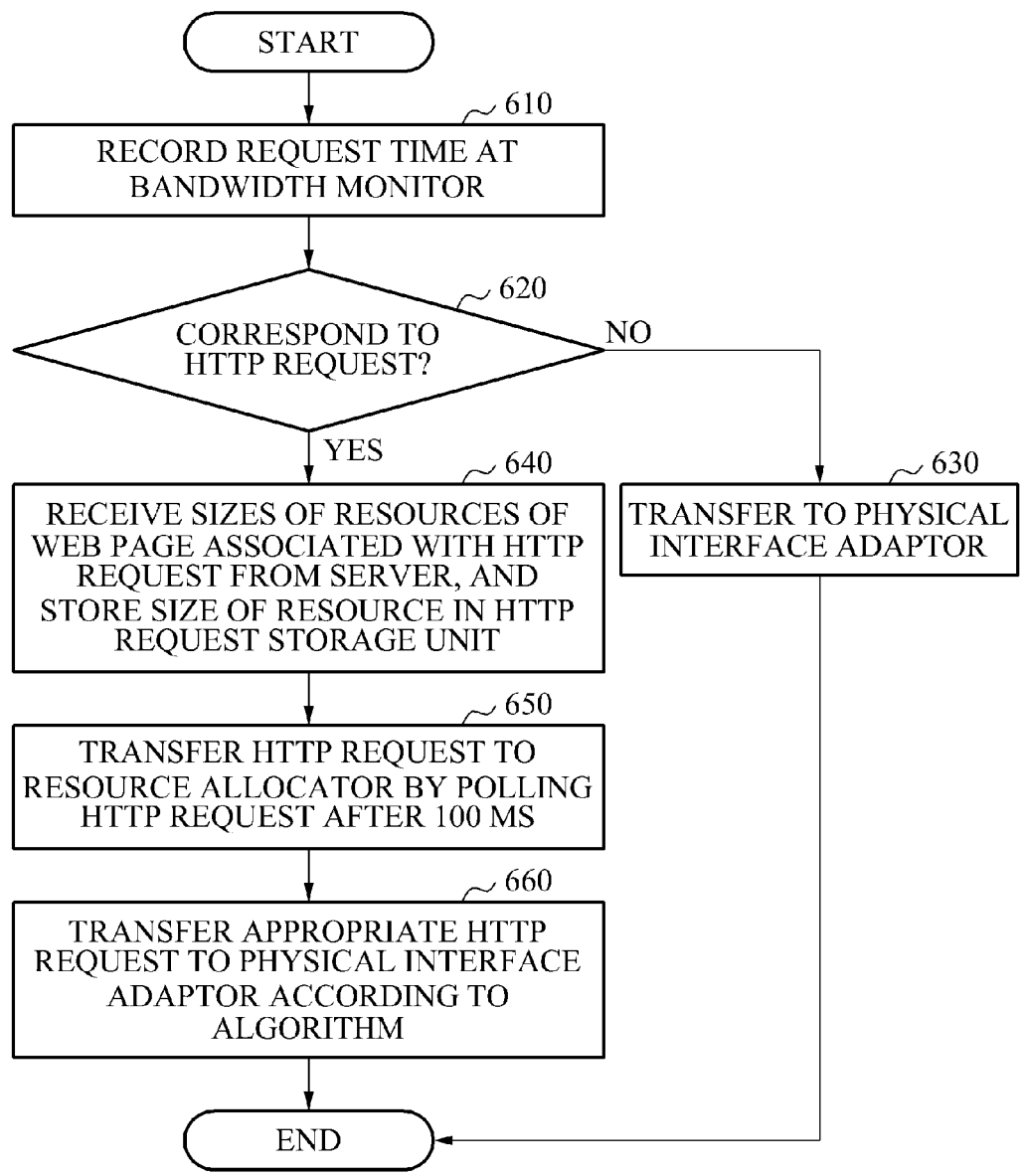
FIG. 6 is a flowchart illustrating a method of loading a web page that may load a web page using multiple paths according to an embodiment of the present invention.

FIG. 6 is a flowchart illustrating a method of loading a web page that may load a web page using multiple paths according to an embodiment of the present invention. Each operation of the web page loading method may be performed by the web page loading system including the allocator 500 described in FIG. 5.

Referring to FIG. 6, every time a data transmission request for each interface occurs at a physical interface adaptor, a bandwidth monitor of the web page loading system may record an amount of time expended until a response with respect to the data transmission request is received, in operation 610. Also, the web page loading system may record sizes of data received via the response with respect to the data transmission request, using a factor. In this instance, the amount of the time expended and the size of the data may correspond to information necessary for calculating average bandwidths supported by each interface.

In operation 620, the web page loading system may filter the data transmission request to be transferred from a connection manager to the physical interface adaptor, and may determine whether the data transmission request corresponds to an HTTP request. When the data transmission request is different from the HTTP request, the web page loading system may transfer the data transmission request, directly, to the physical interface adaptor in operation 630. In contrast, when the data transmission request corresponds to the HTTP request, the web page loading system may receive, from a server, sizes for each individual resource of the web page associated with the HTTP request, along with the HTTP request, and may store the sizes for each individual resource, and the HTTP request in a pool, that is, an HTTP storage unit, in operation 640.

Then, the web page loading system may stand by during a predetermined time, then poll the HTTP request stored in the pool, and transfer the polled HTTP request to a resource allocator in operation 650. The web page loading system may allocate an appropriate HTTP request to the physical interface adaptor based on average bandwidths for each interface according to an algorithm determined by the resource allocator, in operation 660.

A process of recording an amount of time expended for each data transmission request will be further described with reference to FIG. 7.

Figure 7:
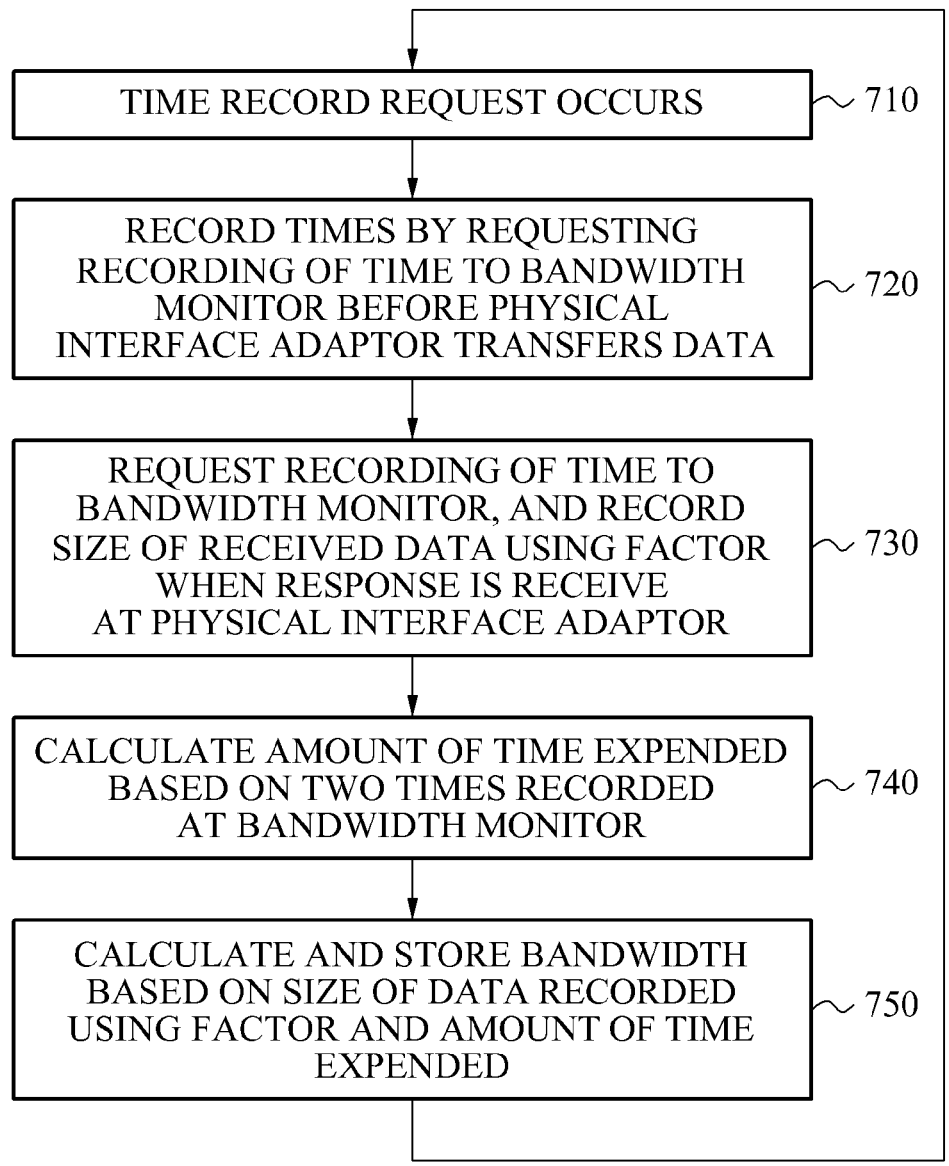
FIGS. 7 and 8 are diagrams illustrating a process of monitoring a bandwidth supported by each interface according to an embodiment of the present invention.

Referring to FIG. 7, when a time record request according to a data transmission at a physical interface adaptor occurs in operation 710, the web page loading system may record a point in time of starting the data transmission, that is, a first time by requesting recording of time to a bandwidth monitor before the physical interface adaptor transmits the data, in operation 720. Also, when a response with respect to the request is received at the physical interface adaptor, the web page loading system may record a point in time when the response is received by requesting recording of the time to the bandwidth monitor, that is, a second time, and may record a size of the data received via the response using a factor, in operation 730. Then, the web page loading system may calculate an amount of time expended in receiving the response with respect to the data transmission request based on the first time and the second time, in operation 740, and may calculate a bandwidth with respect to the data transmission based on the calculated amount of the time expended, and the size of the data recorded using the factor, in operation 750. In this instance, the web page loading system may record the amount of the time expended, and the size of the data associated with each data transmission request, and may store bandwidth data in the bandwidth monitor by calculating the bandwidth data every time a data transmission for each interface occurs.

A process of providing average bandwidths for each interface will be further described with reference to FIG. 8.

Figure 8:
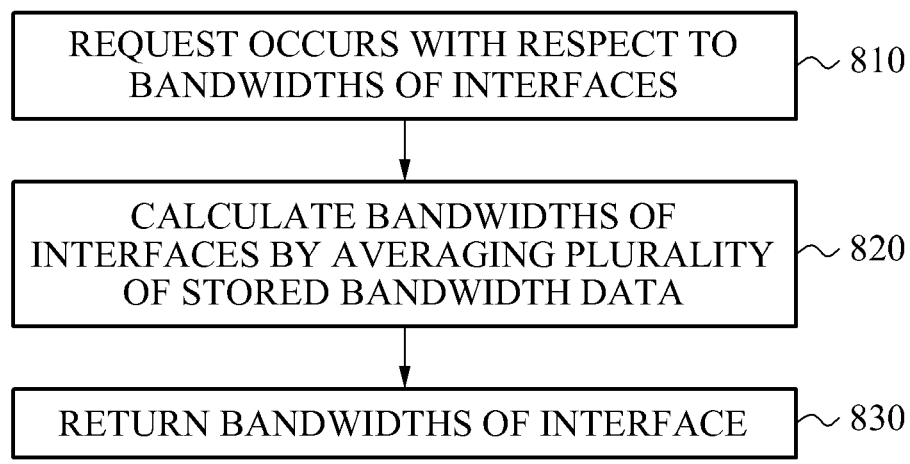

Referring to FIG. 8, when a request for average bandwidths for each interface occurs at a resource allocator in operation 810, the web page loading system may calculate the average bandwidths for each interface by averaging a plurality of bandwidth data for each interface recorded at a bandwidth monitor, in operation 820. Then, the web page loading system may return the average bandwidths for each interface, and may provide the average bandwidths to the resource allocator in operation 830. In this instance, the web page loading system may return a corresponding value given a weight when an amount of time expended for each data transmission request has been measured with respect to the same path.

A process of setting interfaces for each individual resource will be further described with reference to FIG. 9.

Figure 9:
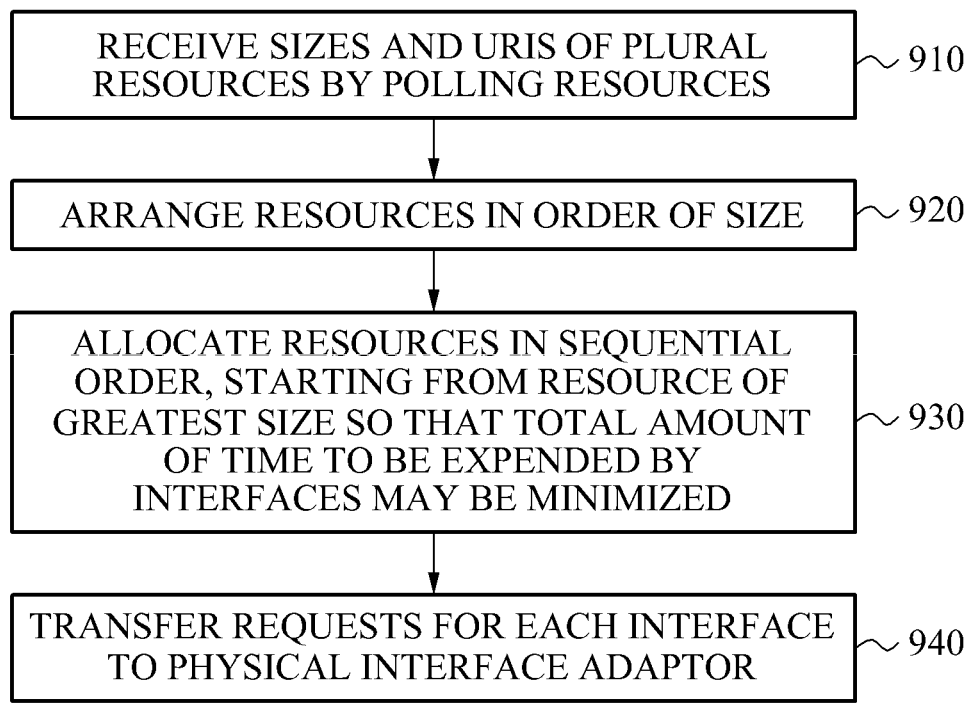
FIG. 9 is a diagram illustrating a process of allocating resources to interfaces based on individual sizes for each resource, and bandwidths for each interface according to an embodiment of the present invention.

Referring to FIG. 9, the web page loading system may receive individual sizes and URIs for each individual resource by polling resources of a web page associated with an HTTP request, in operation 910. The web page loading system may arrange the individual resources based on the individual sizes in operation 920, and may then respectively allocate, to the interfaces, the individual resources in a sequential order, starting from an individual resource of the greatest individual size so that a total amount of loading time expended by the interfaces may be minimized, in operation 930. For example, the web page loading system may allocate the individual resources in a sequential order, starting from an individual resource of the greatest individual size, to the interfaces in a corresponding sequential order, starting from an interface having the most rapid bandwidth. For another example, the web page loading system may allocate, to the interfaces, the individual resources in a sequential order, starting from an individual interface of the greatest individual size, and may allocate the individual resources within a capacity defined based on average bandwidths for each interface and an SLT. When the allocation of the individual resources has been completed, the web page loading system may transfer a request of the individual resources allocated for each interface to a physical interface adaptor, in operation 940.

According to embodiments of the present invention, when resource data is loaded by respectively allocating individual resources constituting a web page to interfaces simultaneously using multiple paths, a bandwidth may be improved in accordance with a sum of bandwidths supported by each interface, and accordingly a web page may be more rapidly loaded.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

The invention claimed is:

1. A system for loading a web page in a communication terminal where multiple interfaces are supported, the system comprising:

a computer memory including a size reception unit stored therein configured to cause the communication terminal to receive individual sizes for each resource constituting a web page from a server providing the web page, the web page associated with a Hypertext Transfer Protocol (HTTP) request when the HTTP request is received from a browser of the communication terminal; and the computer memory also including a resource allocator stored therein configured to cause the communication terminal to set interfaces among multiple interfaces of the communication terminal for loading resources, for each resource constituting a web page and request loading of the resources to the interfaces set for each resource based on bandwidths for respective interfaces, based on the individual sizes for each resource constituting a web page, wherein the bandwidths for respective interfaces are calculated by using an amount of time expended until a response is received with respect to a data transmission request for each interface, wherein the browser renders the web page by respectively loading corresponding resource data through the interfaces set for each resource.

2. The system of claim 1, further comprising a bandwidth monitor to monitor the amount of time expended, along with a size of data received via the response, and to collect bandwidth data calculated based on the amount of the time expended, and the size of the data, and to then calculate the bandwidths based on the collected bandwidth data.

3. The system of claim 1, wherein the resource allocator allocates the resources in a sequential order, starting from a resource of the greatest individual size, to the interfaces in a corresponding sequential order, starting from an interface having the most rapid bandwidth.

4. The system of claim 1, wherein the resource allocator allocates, to the interfaces, the resources in a sequential order, starting from a resource of the greatest individual size, and allocates the resources within a capacity defined based on the bandwidths for each interface and a shortest loading time (SLT), and the SLT corresponds to a time defined based on an overall size calculated by summing individual sizes for each resource, and an overall bandwidth calculated by summing bandwidths for each interface.

5. A method of loading a web page in a communication terminal where multiple interfaces are supported, the method comprising:

receiving individual sizes for each resource constituting a web page from a server providing the web page associated with a Hypertext Transfer Protocol (HTTP) request when the HTTP request is received from a browser of the communication terminal; and setting interfaces among multiple interfaces of the communication terminal for loading resources, for each resource constituting a web page and requesting loading of the resources to the interfaces, based on bandwidths for each interface based on the individual sizes for each resource, wherein the bandwidths for each interface are calculated by using an amount of time expended until a response is received with respect to a data transmission request for each interface, wherein the browser renders the web page by respectively loading corresponding resource data through the interfaces set for each resource.

6. The method of claim 5, the method further comprising:

monitoring the amount of time expended, along with a size of data received via the response; and collecting bandwidth data calculated based on the amount of the time expended, and the size of the data, and then calculating the bandwidths based on the collected bandwidth data.

7. The method of claim 5, wherein setting the interfaces comprises allocating the resources in a sequential order, starting from a resource of the greatest individual size, to the interfaces in a corresponding sequential order, starting from an interface having the most rapid bandwidth.

8. The method of claim 5, wherein setting the interfaces comprises allocating resources in a sequential order, starting from a resource of the greatest individual size, to the interfaces in a corresponding sequential order, starting from an interface having the most rapid bandwidth, and allocates the resources within a capacity defined based on the bandwidths for each interface and a shortest loading time (SLT), and the SLT corresponds to a time defined based on an overall size calculated by summing individual sizes for each resource, and an overall bandwidth calculated by summing bandwidths for each interface.

* * * * *